United States Patent
Cui

(10) Patent No.: US 7,791,756 B2
(45) Date of Patent: Sep. 7, 2010

(54) METHODS FOR IDENTIFYING MARKS USING A DIGITAL MASTER DOCUMENT AND SCANNED IMAGE ENHANCEMENT

(75) Inventor: Chengwu Cui, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 1404 days.

(21) Appl. No.: 11/120,932

(22) Filed: May 3, 2005

(65) Prior Publication Data

US 2006/0250660 A1 Nov. 9, 2006

(51) Int. Cl.
*G06K 15/00* (2006.01)
*G06F 3/12* (2006.01)

(52) U.S. Cl. .................. 358/1.18; 358/1.16; 358/1.6; 358/1.15

(58) Field of Classification Search .............. 358/448, 358/462, 1.9, 1.1, 1.2, 1.5, 1.6, 1.11, 1.12, 358/1.13, 1.15, 1.16, 1.17, 1.18, 505, 404, 358/444, 468, 474, 496, 497; 715/221–226, 715/243, 274; 434/326; 382/100, 312, 317, 382/321, 140

See application file for complete search history.

(56) References Cited

U.S. PATENT DOCUMENTS

| | | | |
|---|---|---|---|
| 4,352,022 A | | 9/1982 | Britton |
| 5,046,005 A | * | 9/1991 | Vilardebo et al. ............ 434/355 |
| 5,134,669 A | | 7/1992 | Keogh et al. |
| 5,245,166 A | | 9/1993 | Shepard |
| 5,321,611 A | | 6/1994 | Clark et al. |
| 5,452,379 A | | 9/1995 | Poor |
| 5,709,551 A | | 1/1998 | Clark et al. |
| 5,852,676 A | * | 12/1998 | Lazar ......................... 382/173 |
| 5,949,692 A | | 9/1999 | Beausang et al. |
| 6,042,384 A | | 3/2000 | Loiacono |
| 6,168,440 B1 | | 1/2001 | Clark et al. |
| 6,173,154 B1 | | 1/2001 | Kucinski et al. |
| 6,193,521 B1 | | 2/2001 | Clark et al. |
| 6,311,040 B1 | | 10/2001 | Kucinski et al. |
| 6,366,760 B1 | | 4/2002 | Kucinski et al. |
| 6,558,166 B1 | | 5/2003 | Clark et al. |
| 6,600,482 B1 | | 7/2003 | Leone, Jr. et al. |
| 6,678,499 B1 | | 1/2004 | Silverbrook et al. |
| 6,684,052 B2 | | 1/2004 | Kucinski et al. |
| 6,697,056 B1 | | 2/2004 | Bergelson et al. |

(Continued)

OTHER PUBLICATIONS

Zhou Wang, Ligang Lu and Alan C. Bovik, "Video Quality Assessment Based on Structural Distortion Measurement," Signal Processing: Image Communication, vol. 19, No. 2. pp. 121-132, Feb. 2004.

*Primary Examiner*—Dov Popovici

(57) ABSTRACT

To reduce errors introduced by a scanner, an unmarked, digital master document may be generated and stored in digital form so that subsequent scanning of the document is unnecessary to place it in digital form for comparison to a marked version of the document. Additionally, regions or fields, rather than the entire digital master document, may be individually created, stored, and subsequently used for comparison to corresponding portions of a marked version. Further, test targets or patterns may be inserted into the content of a digital master document. Characteristics of image quality degeneration and distortion can be extracted from printed versions of the test targets or patterns and used to effect closed loop control to digitally reduce image quality degeneration caused by the scanner.

8 Claims, 8 Drawing Sheets

U.S. PATENT DOCUMENTS

| | | |
|---|---|---|
| 6,707,466 B1 | 3/2004 | Van Sickle et al. |
| 6,711,708 B1 | 3/2004 | Shimomura |
| 6,736,319 B2 | 5/2004 | Swanson et al. |
| 6,741,738 B2 | 5/2004 | Taylor |
| 6,772,081 B1 | 8/2004 | Gedlinske et al. |
| 2001/0033688 A1* | 10/2001 | Taylor ........................ 382/181 |
| 2003/0044091 A1 | 3/2003 | Swanson et al. |
| 2003/0180703 A1* | 9/2003 | Yates et al. .................. 434/353 |
| 2004/0049740 A1* | 3/2004 | Petersen ...................... 715/526 |
| 2004/0135805 A1* | 7/2004 | Gottsacker et al. .......... 345/751 |
| 2004/0185424 A1 | 9/2004 | Kucinski et al. |

* cited by examiner

Fayette District Math

Little Johnny
_____

1. If you had $780 in your checking account and you wrote a check for $347 and made a deposit of $219, what would be the balance in your account?

A. $908

B. $652

C. $1346

(D.) $214

2. Using the number 51.00745, round to the nearest tenth, then, using the number 51.00745 again round to the nearest thousandth. What are the two answers?

A. 51.1, 51.007

B. 51.0, 51.007

(C.) 51.0, 51.008

D. 50, 51.01

3. Triangle ABC is similar to triangle MNP. Side AB has length 5 and side AC has length 12. If side MP has length 36, find the length of side MN.

A. 4

(B.) 2.08

C. 86.4

D. 15

4. In science class, Lisa grouped rocks according to number of colors she could see in the rocks. Twenty rocks had 4 visible colors, seventeen rocks had 3 visible colors, fifteen rocks had 2 visible colors and eleven rocks had only one visible color. What percent of her rocks had 2 or fewer colors visible?

METHODS FOR IDENTIFYING MARKS USING A DIGITAL MASTER DOCUMENT AND SCANNED IMAGE ENHANCEMENT

FIELD OF THE INVENTION

The present invention relates generally to methods for improved optical recognition of marks made on a document, and more specifically, to methods for effecting optical mark recognition by digitally enhancing a scanned document containing marks and comparing the document to a digital master document.

BACKGROUND OF THE INVENTION

Form documents are usually designed to collect input information. For instance, a medical form may be used to collect patient information, and a test sheet may be used to collect a student's response to a set of test questions. Traditionally, such forms are reviewed and stored in various hard-copy formats. The current trend in handling these forms is to digitize them for review, storage and distribution. Such digitization typically occurs using an optical scanner, as is well known in the art.

Some specialized applications use scanned form documents to perform paper interactive tasks and therefore employ Optical Mark Recognition (OMR), Optical Character Recognition (OCR) or other content extraction techniques. However, scanners may distort and degenerate the image of a form document. Scanned image degeneration or distortion increases the failure rate of OMR and OCR more often than desired. Even where advanced image processing algorithms can be used to automate OMR, increasing the reliability of such processes presents a significant challenging to efficient and effective use of content extraction.

One approach to execute OMR and other content extraction techniques employs the digitization of a blank form document that is used to compare to the filled-in form document. Thus, the difference between the two forms may yield the marks made on the filled-in form. Unfortunately, there are two significant disadvantages of this approach. One is that an extra step is needed to digitize and store a blank form document. The other is that the digital blank form document will inevitably bear characteristics of the digitizer or scanner used to generate it. In particular, scanner image quality degradation in the form of blurring and distortion will provide a blank form document that may be different from a blank form document scanned by another scanner. Such differences will contribute to errors during the recognition stage.

Therefore, what is needed are systems and methods for facilitating content extraction such as OMR and OCR from a document, and for maximizing the accuracy of such content extraction techniques by reducing quality degeneration of the document caused by printers, digitizers, scanners, and the like.

BRIEF SUMMARY OF THE INVENTION

To reduce errors introduced by a scanner, an unmarked, digital master document may be generated and stored in digital form so that subsequent scanning of the document is unnecessary to place it in digital form for comparison to a marked version of the document. Additionally, because a direct pixel map comparison may only utilize a portion of a digital master document for comparison, such as regions or fields, rather than the entire document, portions of a digital master copy may be individually created, stored, and subsequently used for comparison to corresponding portions of a marked copy. Additionally, test targets or patterns may be inserted into the content of a document. Characteristics of image quality degeneration and distortion can be extracted from these printed test targets or patterns and used to effect closed loop control to digitally reduce image quality degeneration caused by the scanner.

According to one embodiment of the invention, there is disclosed a method for optical mark recognition. The method includes generating a digital master document, storing the digital master document, and printing a copy of the digital master document, where the printed copy receives at least one marking thereon. The method also includes scanning the printed copy after it receives the at least one marking thereon, and comparing the digital master document to the scanned copy to identify the at least one marking.

According to one aspect of the invention, the step of generating the digital master document includes generating the digital master document from at least one stored field. According to another aspect of the invention, the method also includes the step of creating the at least one stored field prior to the generating step. The step of creating the at least one stored field may include generating the at least one stored field using a Postscript™ page description. According to another aspect of the invention, the method may include the step of digitizing the at least one stored field.

According to yet another aspect of the invention, the method may include the step of storing field characteristic information corresponding to the at least one stored field, prior to the comparison step. The field characteristic information may identify the location of the at least one field in the digital master document. Additionally, the step of comparing the digital master document to the scanned copy may also include comparing the digital master document to the scanned copy using the at least one field and the field characteristic information.

According to another aspect of the invention, the method may include the step of automatically identifying the location of one or more fields within the scanned copy, where the location of the one or more fields within the scanned copy correspond to the location of the at least one field in the digital master document. The step of automatically identifying the location of one or more fields within the scanned copy may also include the step of automatically identifying the location of the one or more fields within the scanned copy using the field characteristic information.

According to yet another aspect of the invention, the method may include the step of correcting errors created during the scanning of the scanned copy subsequent to the scanning of the copy and prior to the comparison step. The step of correcting errors may include comparing the scanned copy to the digital master copy to identify image degeneration or image scaling in the scanned copy. The method may also include the step of inserting a test pattern in the digital master copy, such as a frame box, where the test pattern is inserted prior to the printing of the copy of the master document, such that the scanned copy includes a corresponding test pattern. The step of correcting errors may include comparing the test pattern in the digital master document to the corresponding test pattern in the scanned copy to identify differences between the test pattern in the digital master document and the corresponding test pattern in the scanned copy. Additionally, the step of correcting errors may also include the step of using the identified differences to generate a filter operable to alter the corresponding test pattern in the scanned copy to return the corresponding test pattern to a form more similar to that of the test pattern in the digital master document.

According to one aspect of the invention, the step of generating a filter includes the step of generating a filter using a convolution operation. The method may also include the step of applying the filter to the scanned copy. According to yet another aspect, the step of comparing the digital master document to the scanned copy to identify the at least one marking further includes comparing a pixel map of at least a portion of the digital master document to a corresponding pixel map of at least a portion of the scanned copy. Further, the method may include the step of altering the scanned copy by shifting the image of the scanned copy in the vertical or horizontal direction prior to the comparison step.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 5 shows an illustrative example of a test page having a frame box, according to one aspect of the present invention.

DETAILED DESCRIPTION OF THE INVENTION

The present inventions now will be described more fully hereinafter with reference to the accompanying drawings, in which some, but not all embodiments of the invention are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

The present invention will be discussed herein with reference to an illustrative example of the recognition of an answer mark for a multiple choice test question. However, it should be appreciated that the methods of the present invention are applicable to the recognition of a marking made on any document. Therefore, the examples discussed in detail herein are intended only as non-limiting illustrative examples, as the methods of the present invention may be used to effect mark recognition on virtually any document or form that may be generated or manipulated by a computer. These may include medical forms, surveys, tests or evaluations, and the like.

Figure 1:
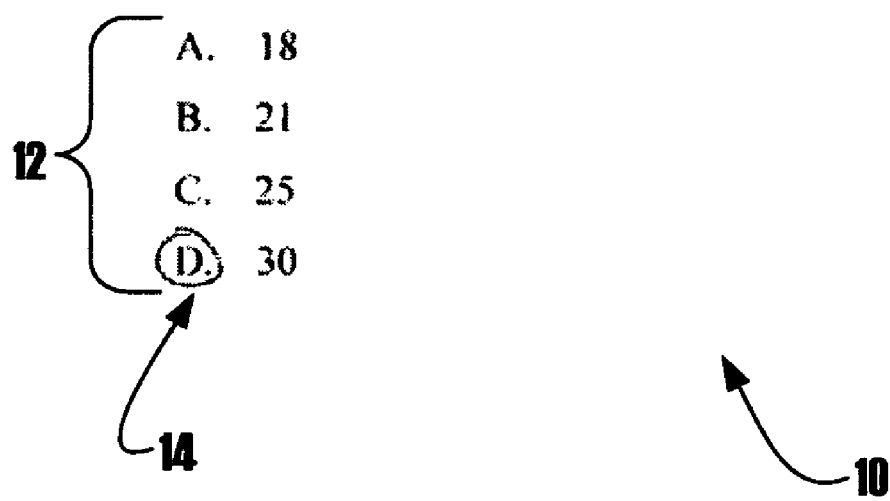
FIG. 1 shows an illustrative example of a multiple choice problem having a user-circled answer marking.

FIG. 1 shows an illustrative example of a simple multiple choice problem 10 providing a test-taker a choice of answer choices 12 to a multiple choice question. As is known, multiple choice tests normally designed for human grading are usually administered to a test-takers who are instructed to circle the correct answer (e.g., an A, B, C, or D answer choice) for each question. The multiple choice problem 10 shown in FIG. 1 has already been administered to a test-taker, and includes a marking 14 designating the user's answer selection. As shown in FIG. 1, the marking 14 is a small, handwritten circle around answer choice 'D'.

As described in the U.S. patent application filed concurrently herewith, titled "Methods For Automatically Identifying User Selected Answers On A Test Sheet" (hereafter referred to as the "Mark Identifying Patent Application"), the contents of which are incorporated by reference as if set forth fully herein, the test-taker's answer selection may be automatically identified by scanning the completed multiple choice problem 10 having the test-taker's marking 14 and comparing the completed multiple choice problem 10 to a scanned, clean copy of the problem. Thus, the comparison may be performed using digital copies of both the completed multiple choice problem (i.e., the test-taker's marked copy) and an unmarked version. A scanner may capture images of the marked copy and convert it into a digital pixel map, which allows for computer processing of the digital pixel map. As described in the Mark Identifying Patent Application, a direct pixel map comparison of the marked copy and the unmarked version may be made to identify the changes the test-taker has made to the test. Although a direct pixel map comparison may be made between digital versions of an entire unmarked document and a marked document, the Mark Identifying Patent Application discloses that only corresponding regions or fields of the documents may be compared to maximize the speed and minimizing the computing power required for the comparison. For example, only fields around the answer choices may be compared on the unmarked version and the marked copy. Thus, a square field (or an equivalent) around each answer alternative on the marked copy may be compared to the same square region (or equivalent) around each answer choice on the unmarked version.

Unfortunately, one of the difficulties in implementing a direct pixel map comparison of an unmarked document and a marked copy as described with reference to FIG. 1 is that extra steps are needed to scan and store a copy of an unmarked document for executing the pixel map comparison. Another is that a scanner used to create the digital version of the unmarked copy for use in the pixel map comparison may introduce unwanted scanner characteristics of the digitizer or scanner used. In particular, scanner image quality degradation in the form of blurring and distortion may result in slight changes to the unmarked copy. These differences may contribute to errors during the direct pixel map comparison (i.e., mark recognition) of the unmarked copy to the marked copy.

According to the present invention, to reduce errors introduced by a scanner an unmarked, digital master document may be generated and stored in digital form so that subsequent scanning of the document is unnecessary to place it in digital form for comparison to a marked copy. According to another aspect of the invention, because a direct pixel map comparison may only utilize a portion of a digital master document for comparison rather than the entire document, such as one or more regions or fields of the digital master document, portions of a digital master copy may be individually created, stored, and subsequently used for comparison to corresponding portions of a marked copy.

Figure 2:
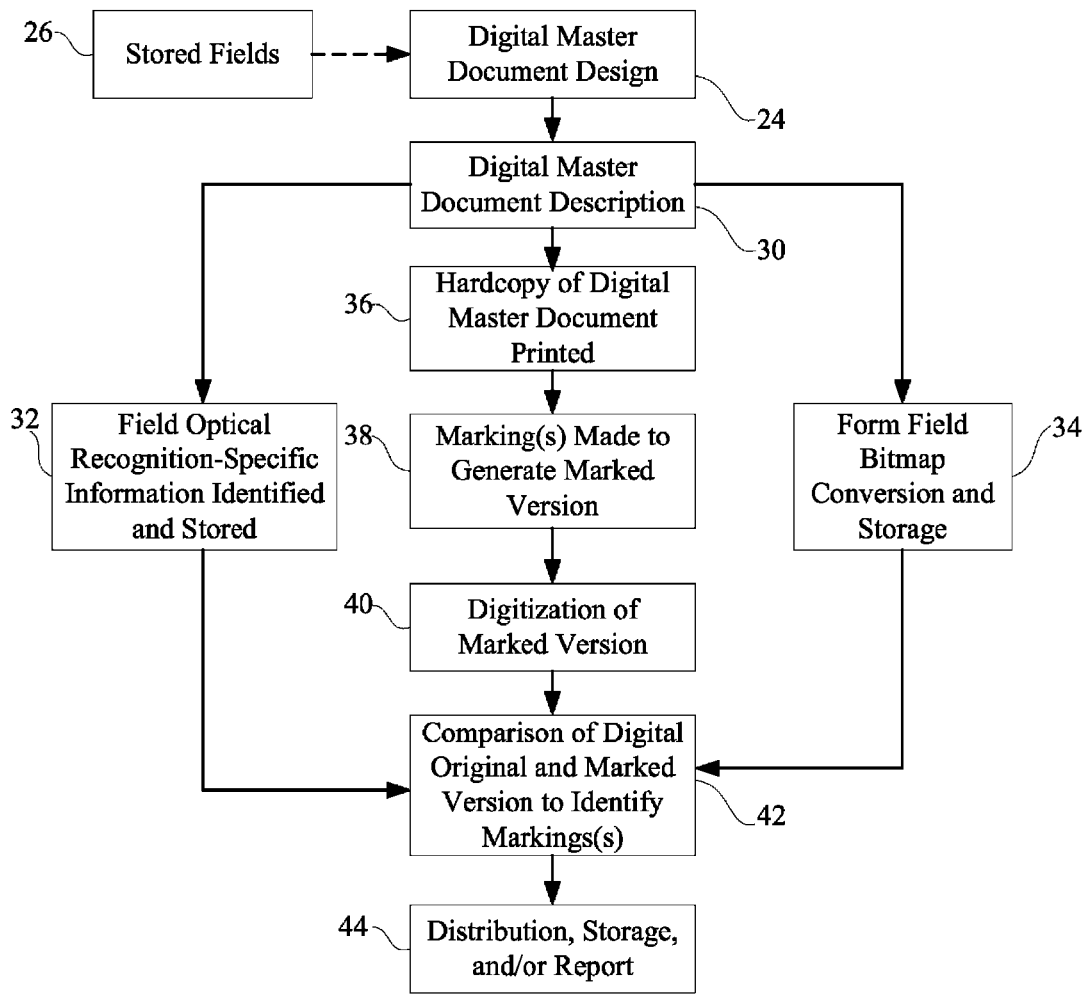
FIG. 2 shows a block diagram flowchart illustrating a method of generating a digital master document and using the digital master document to identify changes made to a marked version of document, according to one embodiment of the present invention.

FIG. 2 shows a block flowchart illustrating a method of generating a digital master document and using the digital master document to identify changes made to a marked version of document, according to one embodiment of the present invention. As illustrated in FIG. 2, a digital master document is designed (block 24) using plain code, script, or the like. According to one aspect of the invention, the digital master document may be designed from scratch, without relying on any stored content for its creation. However, according to a preferred embodiment of the present invention, the digital master document is designed, at least in part, using one or more previously generated, stored fields (block 26). Fields may include content to be included on the digital master document. In an illustrative example, fields may represent individual test questions, such that a test may be generated using a plurality of stored test questions that are combined to design the digital master document.

Each of the fields may be generated by an author using a page description language or the like. According to one embodiment of the invention, the Postscript™ page description language may be used to generate a field. Nevertheless, it will be appreciated that other languages adept at printing graphics and text may alternatively be used to create fields according to the present invention. An illustrative example of a field 45 is shown enclosed with dashed lines in FIG. 3a, where the field 45 comprises the letter "A.", which may represent an answer selection in a multiple choice problem. According to one aspect of the invention, fields (block 26) may be stored in a database for use in a digital master document. Using fields to generate a digital master document allows multiple different master documents to be generated using select fields stored in a database. For instance, continuing with the illustrative example of multiple choice tests, a multitude of digital master documents having the same questions, but in different order and arrangement on test pages, may be made using identical stored fields.

The combination of fields making up the digital master document is represented by a digital master document description (block 30). More specifically, according to one embodiment of the invention, the digital master document description (block 30) identifies individual fields within the digital master document. Each field within the digital master document may be identified by a unique name and/or field identifier. Once the digital master document description is complete, the individual fields within the digital master document may be converted into bitmaps (block 34) for use in comparing the fields to corresponding fields in a marked version. The fields may also be converted into other graphic formats for storage, including compressed formats such as JPEG, TIFF, and the like, as are known in the art.

According to one embodiment of the present invention, each field may be stored with field characteristic information (block 32). The field characteristic information may be used to identify the location and size of a field within the digital master document, such that a field within a marked copy can be identified and compared to its corresponding field in the digital master document. For instance, identifying the location of a 10 pixel by 10 pixel field in the digital master document identifies the corresponding 10 by 10 pixel field on a marked document against which the field in the digital master document will be compared. Location information may be stored with reference to pixel coordinates based on a two-dimensional coordinate system. For instance, each field may be mapped based on a coordinate system where a first corner of the digital master document is at coordinates (0,0), and the opposite corner of the document is at coordinates (X,Y). It will be appreciated that the fields may be mapped using the coordinates of a corner of the field, of the center of the field, or the like.

According to another aspect of the invention, the field characteristic information may identify the location of a field based on its spatial position with respect to another field. Therefore, the location of related fields, such as answer choices to a multiple choice question, may be defined with respect to each other. Furthermore, field information that is not specific to the position of the field in the digital master document, such as the size of the field in pixels, may also be included in the field characteristic information. This generic field characteristic information may also be stored with the field (block 26), such that the information is known immediately upon its selection for use in a digital master document. Like the field, the field characteristic information may be stored in a designated database, or as part of a central database, or may also be included within the form description.

Although the present invention is described herein with respect to a digital master document that includes one or more fields that are stored separately and have respective field characteristic information, it will be appreciated that as an alternative an entire digital master document may be stored along with coordinates and dimensions of each field. However, such an approach will likely use more storage space. Additionally, processing a graphical representation to examine only a portion (i.e., field) within a digital master document may result in unneeded processing that slows down the comparison process.

Referring once again to FIG. 2, after a digital master document is generated, a hardcopy of the document may be printed (block 36). The printing of the document is executed preferably directly from the form description, such that any individual fields are printed from their Postscript™ page description or equivalent language, as opposed to printing the document using the rendering of multiple fields, or the entire digital master document, in a bitmap or other compressed or uncompressed format. However, one or more of the latter methods may also be used to generate the hardcopy of the digital master document. Next, one or more users may place markings on the hardcopy of the digital master document (block 38), thereby creating a marked document. For instance, where the document is a test, the marking may comprise one or more answers to test questions, as in the illustrative example shown in FIG. 1.

Figure 3A:
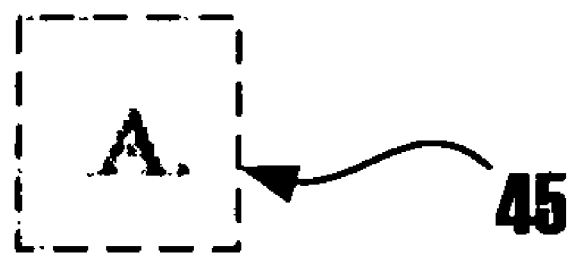
FIG. 3a shows an illustrative example of a field for a test answer, according to one aspect of the present invention.
Figure 3B:
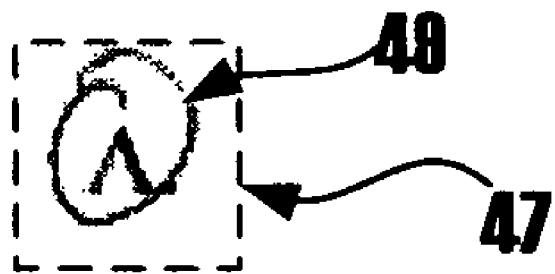
FIG. 3b shows an illustrative example of a marked field corresponding to the field of FIG. 3a, according to an illustrative example of the present invention.

After a user makes one or more markings, the marked document is digitized. As is well known in the art, this may be carried out by a scanner. According to a preferred embodiment of the invention, the marked version is stored as a bitmap, though it may also be stored in other formats and converted to a bitmap for the comparison (block 42) to the bitmaps of digital master document fields, or to the bitmap of the entire digital master document. For instance, as illustrated in FIGS. 3a and 3b, using the field characteristic information, an unmarked version of a field 45 may identify a corresponding marked field 47 that includes a marking 49, which represents an answer selection in a multiple choice problem. The pixels in the marked field 47 can then be compared to the same field 45 in the digital master document. The comparison of the marked copy to the fields of the digital master document (or the entire digital master document) is described in detail in the Mark Identifying Patent Application identified above. Next, after the user's marking are identified, the results may be interpreted (e.g., what answers in a multiple choice question were identified by a user's marks), as is also discussed in detail in the Mark Identifying Patent Application. The results may then distributed, stored and/or reported (block 44). For instance, the results may be transmitted via a LAN or WAN (including the Internet) for storage in one or more databases.

It will be appreciated that the use of a digital master document effectively adjusts for errors that would otherwise be introduced due to the printing and subsequent scanning of a clean copy of a document. However, it should also be appreciated that errors in the comparison process may also occur due to the printing and scanning of a marked document. In particular, errors may be introduced by the printing and scanning of the marked document because a printer may not always generate a perfect copy of a digital document, and a scanner can degenerate the image quality of an original document. Because a direct pixel map comparison will identify the difference between the bitmaps of the digital master copy and the marked document, errors introduced by the printing and scanning of the marked document may thwart the accurate identification of user-markings.

According to one aspect of the invention, systems and methods of the present invention may adjust for errors introduced by the printing and scanning of a marked document. For documents scanned for content extraction or mark identification, the most notable forms of degeneration include distortion degeneration (translation, rotating and scaling) and resolution degeneration (blurring), which may occur as a result of both a printing and scanning. These errors may be corrected prior to the identification of a user's markings in the comparison process (block 42). As described in detail below, some of these methods utilize the use of a test mark to permit the identification and correction of errors introduced by the printing and scanning of a marked document.

Figure 4A:
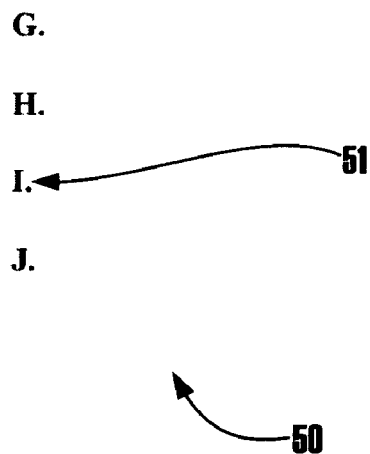
FIG. 4a shows a digital master document having answer choices, according to an illustrative example of the present invention.
Figure 4B:
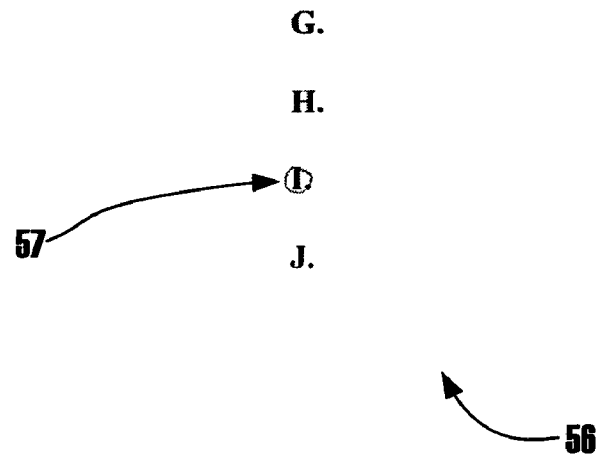
FIG. 4b shows a copy of the digital master document of FIG. 4a with one of the answer choices marked, according to an illustrative example of the present invention.
Figure 4C:
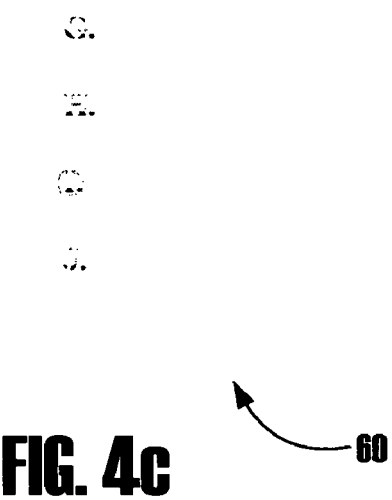
FIG. 4c shows a difference map showing the difference between the document and marked copy shown in FIGS. 4a and 4b, respectively, according to an illustrative example of the invention.

An illustrative example of a problematic alignment error between marked fields and the corresponding fields of a digital master document is shown in the illustrative example of FIG. 4a-4c. As shown in the figures, a vertically misaligned letter "I" 57 in a scanned, marked document 56 may be subtracted by the original, digital "I" 51 in a digital master document 50, which results in a pixel difference map 60 that shows fewer pixel differences around the marked letter "I" than the same misalignment of an unmarked larger letter, such as the letter "G". Thus, in the illustrative example shown in FIGS. 4a-4c, the letter "G" may be mistakenly recognized as the selected letter when the letter "I" is circled with a pen of an super fine point or a color that a scanner is less sensitive to. This is because the algorithm may determine the selected answer based on the number of pixel differences, as identified by a pixel difference map, that occur within respective regions defined around answers, such as is described in the Mark Identifying Application. In contrast, if there were no alignment errors between the digital master document 50 and the scanned, marked document 56, the pixel difference map 60 would only include the user's circular marking around the letter "I" and the user's mark could be easily identified.

According to one aspect of the present invention, to further improve the reliability of the comparison step (block 42), horizontal and vertical misalignment error ratios may be computed and stored with a field to assist in recognition of user-made markings. To generate ratios, a copy of a digital master document or a field may be shifted and compared against the original, unshifted digital version. This may occur during the generation of the field. The shifting may be effected in both horizontal and vertical directions, which would produce a variety of difference bitmaps corresponding to each shift. This method cures the problems illustrated, for instance, by a misalignment as illustrated in FIGS. 4a-4c. Each difference bitmap may be converted into a ratio that is a numerical measure of the differences between the original field and the shifted field. The greatest difference results in the greatest ratio, and the smallest difference results in the smallest ratio. During the comparison process, the shifting occurs based on the ratio, which may be implemented by the comparison algorithm. According to one aspect of the invention, the algorithm may identify a shift where more than one field, or all but one field, are closer to their original form only after their respective ratios are used to adjust each field for misalignment. In that scenario, the ratios for each field may be retrieved and used to determine which letter is selected.

Next, it will be appreciated that unlike the traditional scanning approach described with respect to FIG. 1, where the quality of the unmarked document is usually unknown due to its scanning, the availability of the digital master document enables the identification of scanner-induced degeneration and distortion in a marked document. This enables closed-loop correction to improve the quality of a scanned image.

According to one embodiment of the present invention, test patterns may be inserted into the content of a digital master document and used to minimize image quality degeneration and distortion. Because the characteristics of a test pattern are known in the digital master document, including the location, size, orientation, and shape of the test pattern, the image quality degeneration of those test patterns in a printed and scanned document, such as a marked document, may be identified. Characteristics of image quality degeneration and distortion may then be extracted from the inserted test patterns and used to reverse or reduce the image quality degeneration caused by the scanning of a marked document. Thus, the marked document may undergo a filtering process to return the document to a form that is similar to the digital master document, but for the addition of a user's markings. Thus, the comparison of the marked copy and the digital master document may be made to identify substantially only the user's markings.

More specifically, it will be appreciated that distortion may include document skewing caused by processes such as the automatic document feeding process of a scanner. It may also include arbitrary scaling which can be unnoticeable to the human observer by any device. To extract such distortion information, the insertion of one or more test patterns in the form of a two dimensional pattern or grid may be used. Because a printed grid can be highly visually intrusive and thus undesirable, printed borders may be used to implement the test patterns, which may be implemented in the form of a frame box. Thus, according to one aspect of the invention, a digital master document may be created that includes a frame box printed at the edge of a page. FIG. 5 shows an illustrative example of a test page 82 that includes a frame box 80. The frame box 80 of FIG. 5 includes vertical lines 84 and horizontal lines 86. The lines 84, 86 are positioned substantially contiguous with the edges of the test page 82. It will be appreciated that although the lines 84, 86 extend substantially the entire length of each side, or each edge, of the test page 82, that smaller indicia may be used that do not form a continuous border. According to one embodiment of the invention, the indicia may also represent coded borders as described in detail with reference to U.S. patent application Ser. No. 11/006425, titled "Methods For Providing Encoded Visual Borders On A Scannable Document", filed on Dec. 7, 2004, the contents of which are incorporated by reference as if set forth fully herein.

According to one aspect of the invention, the frame box 80 is printed with sufficient thickness and darkness so that a scanned image of the page 82 provides spatial distortion correction data needed to correct the entire page. For instance, the four corners of the virtual frame box may be (0,0), (W,0), (0,L), (W,L), where W and L are the width and length of the frame box 80. According to one aspect of the invention, the frame box 80 may be substantially the same size as the page 82, such that the frame box 80 is printed on the outermost portion of the page 82. Thus, the width of the frame box may be substantially equal to the width of the page, and the length of the frame box may be substantially equal to the length of the page. According to one aspect of the invention, each point on the frame box 80 may be "distorted" to a new location on the scanned page due to the distortion nature and magnitude of both a printer that generated the page, and of the scanner that scanned in the marked page.

It will be appreciated that if an image pixel P in the digital master document has location (x,y), the new location of (x', y') in the scanned image may be determined by the Taylor polynomials:

$$x' = \sum_{i=0}^{I} \sum_{j=0}^{J} a_{ij} x^i y^j$$

$$y' = \sum_{i=0}^{I} \sum_{j=0}^{J} b_{ij} x^i y^j$$

where the value of I and J are dependent on the distortion present in the scanner. For example, if there is translation and rotation distortion, as are known in the art, I and J will equal one (1), and the equations are simplified to linear forms. When the frame box is extracted from the scanned page, each point on the box has a new location x', y'. Using this coordinate information, distortion coefficients $a_{ij}$ and $b_{ij}$ may be estimated using a least square estimator for coefficient estimations. Other estimators, as are known in the art, may alternatively be used. The distorted image can then be corrected by the above equation pixel by pixel, specifically, by reversing the equation and solving for the accurate location x,y, and shifting the scanned points to their accurate locations. It will be appreciated by those of ordinary skill in the art that certain pixels may also be computed by interpolation.

Figure 6A:
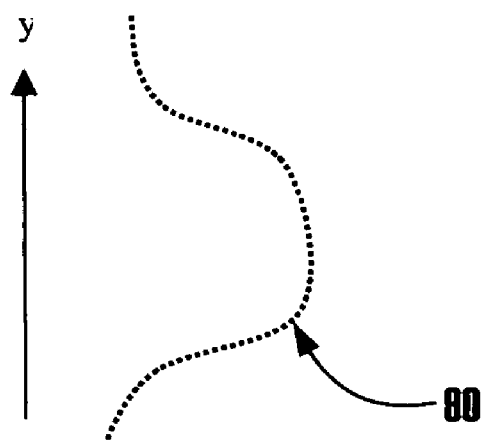
FIG. 6a shows a horizontal line spread profile, according to an illustrative example of the present invention.
Figure 6B:
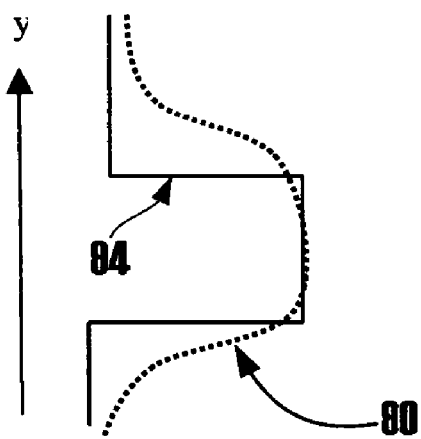
FIG. 6b shows a rectangle line profile recovered from a blurred line spread profile, according to an illustrative example of the present invention.

It will be appreciated that the frame box 80 described above with reference to FIG. 5 may also contain information demonstrating blurring by both a printer and/or the scanner when compared to a digital master copy. The horizontal lines 86 provide the y component of a combined system point spread function for the printer and scanner. FIG. 6a shows an illustrative horizontal line density profile 90. Such a density profile 90 is result of an ideal line profile convoluted by the y component of the combined point spread function of the printer and scanner. Because the virtual frame box is mathematically sharp, a filter can therefore be found to transform the horizontal blurred line spread into a rectangle profile, or recover the original ideal line profile 84, as is shown in the illustrative example of FIG. 6b. In particular, FIG. 6b shows a rectangular line profile 84 recovered from a blurred line. There are many procedures that can be used to recover the convolution filter. For instance, assuming the distortion function of a scanner is Dx(x,y) and Dy(x,y) and the equivalent point spread function of the scanner is P(x,y), then a field F(u,v) becomes F[Dx(u,v), Dy(u,v)]⊗P(x,y), where ⊗ is the convolution operator. This operation may be made on the digital master document prior to, or during an initial phase of, the execution of the comparison step (block 42). A more detailed example is shown in FIG. 7, which shows a block diagram flowchart for finding a convolution operator and applying a filter to correct for the blurring in a scanned document, according to one embodiment of the present invention.

Figure 7:
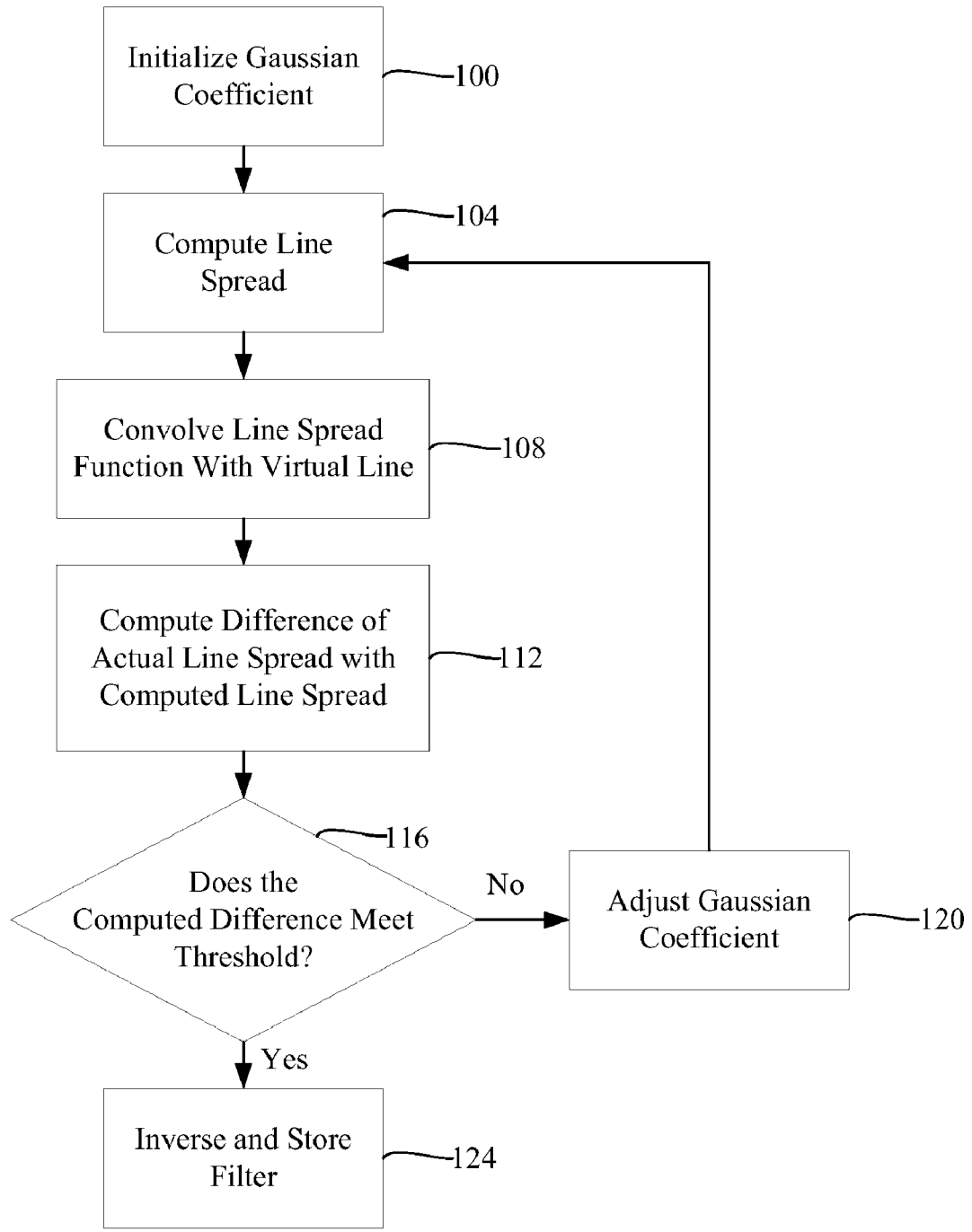
FIG. 7 shows a block diagram flowchart for finding a convolution operator and applying a filter to correct for errors in a scanned document, according to one embodiment of the present invention.

As illustrated in FIG. 7, a Gaussian line spread is assumed (block 100), from which a line spread is computed (block 104). Other mathematical as well as numerical spread functions can also be used instead of the Gaussian function. In the example described by FIG. 7, an initial set of Gaussian coefficients are first used to create a Gaussian profile. The virtual line target is then convolved (block 108) with the created Gaussian profile. The resulted blurred line is compared to the actual scanned line by subtracting one from another or other means (block 112). If the difference is not sufficiently small (block 116), which may be determined by comparing the difference to a pre-set threshold, the Gaussian coefficients are adjusted (block 120) and a new Gaussian profile will be generated to convolve with the virtual line target and compare the resulted blurred line to the scanned line. The process is repeated until a satisfactory match is achieved. If the difference is sufficiently small, the Gaussian profile is then stored as the line spread profile of the scanned document (block 124). An inverse filter may then be created and applied to the scanned image to sharpen the scanned document. Applying the filter to the whole marked document will reverse the resolution degradation by the printer and the scanner. This approach is only possible because of the prior knowledge of the target, in the case, the virtual frame box described above with respect to FIG. 5.

Figure 8:
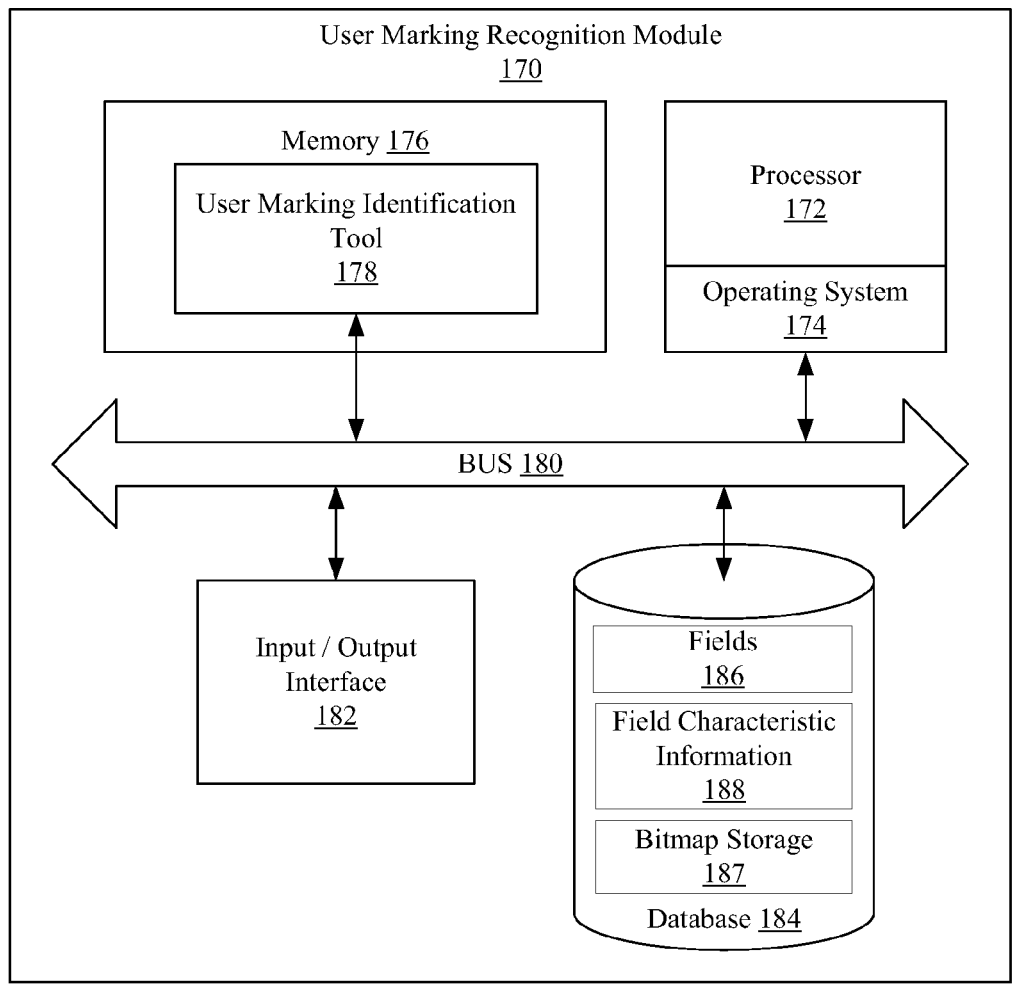
FIG. 8 shows a block diagram of a user marking recognition module, according to one aspect of the present invention.

It will be appreciated that each of the methods described above with respect to FIGS. 1-7 may be implemented by computer software and/or hardware, as described next with reference to FIG. 8. FIG. 8 shows a block diagram of a user marking recognition module 170, according to one aspect of the present invention. As illustrated in FIG. 1, the user marking recognition module 170 generally includes a processor 172, operating system 174, memory 176, input/output (I/O) interface 182, database 184 and bus 180. The bus 180 includes data and address bus lines to facilitate communication between the processor 172, operating system 174 and the other components within the module 170, including the user marking identification tool 178, the input/output interface 182 and the database 184. The processor 172 executes the operating system 174, and together the processor 172 and operating system 174 are operable to execute functions implemented by the user marking recognition module 170, including software applications stored in the memory 176, as is well known in the art. Specifically, to implement the methods described herein with respect to FIGS. 1-7 the processor 172 and operating system 174 are operable to execute the user marking identification tool 178 stored within the memory 176. According to one aspect of the invention, the user marking identification tool 178 may include one or more algorithms for executing the methods and processes described above with respect to FIGS. 1-7.

It will be appreciated that the memory 176 in which the user marking identification tool 178 resides may include random access memory, read-only memory, a hard disk drive, a floppy disk drive, a CD Rom drive, or optical disk drive, for storing information on various computer-readable media, such as a hard disk, a removable magnetic disk, or a CD-ROM disk. Generally, the user marking identification tool 178 receives information input or received by the user marking recognition module 170, including digital versions of the marked and unmarked answer sheets. The user marking identification tool 178 also receives stored fields 186 and their field characteristic information 188, which identifies the location of fields on a document. According to one aspect of the invention, the fields 186 and field characteristic information 188 may be stored local to the user marking recognition module 170, such as in the database 184, although the data may also be received from one or more remote sources via the I/O interface 182. Using information it receives, the user marking identification tool 178 effects the methods described in detail above with respect to FIGS. 1-7 to identify user markings. Therefore, the user marking identification tool 178 may be operable to execute computations, compare and alter digital images, generate difference maps, count pixels within maps, process information, and the like, as needed to execute the methods described herein.

Referring again to FIG. 8, the processor 172 is in communication with the I/O interface 182 to control and communicate with I/O devices. Typical user I/O devices may include a video display, a keyboard, a scanner, a mouse or other input or output devices. Additionally, the I/O interface 182 may provide one or more I/O ports and/or one or more network interfaces that permit the user marking recognition module 170 to communicate with other network devices. According to one aspect of the invention, the user marking recognition module 170 may transmit data to remote sources, such as via a LAN, WAN, the Internet, or the like, send and receive fields 186 and field characteristic information 188, receive digital images of a marked copy and unmarked version of a document or field, and the like. Therefore, the I/O interface 182 may also include a system, such as a modem, for effecting a connection to a communications network.

The database 184 of the user marking recognition module 170, which is connected to the bus 180 by an appropriate interface, may include random access memory, read-only memory, a hard disk drive, a floppy disk drive, a CD Rom drive, or optical disk drive, for storing information on various computer-readable media, such as a hard disk, a removable magnetic disk, or a CD-ROM disk. In general, the purpose of the database 184 is to provide non-volatile storage to the user marking recognition module 170. As shown in FIG. 8, the database includes one or more tables, segments or files within the database 184 to store fields 186, field characteristic information 188, and bitmaps 187. Each may be used to execute the functions described herein to identify test-takers' answers, which may be stored as test-taker answer data within the database 184 and/or transmitted to a remote location Although not illustrated, the database 184 may also store digital images, such as difference maps, similarity maps, and the like, used to execute the processes described above.

It is important to note that the computer-readable media described above with respect to the memory 176 and database 182 could be replaced by any other type of computer-readable media known in the art. Such media include, for example, magnetic cassettes, flash memory cards, digital video disks, and Bernoulli cartridges. It will be also appreciated by one of ordinary skill in the art that one or more of the user marking recognition module 170 components may be located geographically remotely from other user marking recognition module 170 components.

It should also be appreciated that the components illustrated in FIG. 8 support combinations of means for performing the specified functions described herein. As noted above, it will also be understood that each of the methods described above, including the processes and computations described with reference to FIGS. 2 and 7, can be implemented by special purpose hardware-based computer systems that perform the specified functions or steps, or combinations of special purpose hardware and computer instructions. Further, the user marking recognition module 170 may be embodied as a data processing system or a computer program product on a computer-readable storage medium having computer-readable program code means embodied in the storage medium. Any suitable computer-readable storage medium may be utilized including hard disks, CD-ROMs, DVDs, optical storage devices, or magnetic storage devices. Additionally, although illustrated individually in FIG. 8, each component of the user marking recognition module 170 may be combined with other components within the user marking recognition module 170 to effect the functions described herein. Accordingly, the user marking recognition module 170 may take the form of an entirely hardware embodiment, an entirely software embodiment or an embodiment combining software and hardware aspects, such as firmware.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method for optical mark recognition, comprising:
generating a digital master document,
storing the digital master document,
printing a copy of the digital master document, wherein said printed copy receives at least one marking thereon;
scanning the printed copy after it receives the at least one marking thereon;
comparing the digital master document to the scanned copy to identify the at least one marking,
wherein generating the digital master document comprises generating the digital master document based on a user defined selection of at least one stored field from a plurality of stored fields; and
storing field characteristic information corresponding to the at least one selected stored field prior to the comparing the digital master document to the scanned copy and prior to the scanning of the printed copy.

2. The method of claim 1, further comprising creating the at least one stored field prior to the generating the digital master document.

3. The method of claim 2, wherein the creating the at least one stored field comprises generating the at least one stored field using a page description language.

4. The method of claim 1, further comprising digitizing the at least one stored field.

5. The method of claim 1, wherein the field characteristic information identifies a location of the at least one selected stored field in the digital master document.

6. The method of claim 1, wherein the comparing the digital master document to the scanned copy further comprises comparing the digital master document to the scanned copy using the at least one selected stored field and the field characteristic information.

7. The method of claim 5, further comprising automatically identifying a location of one or more fields within the scanned copy, wherein the location of the one or more fields within the scanned copy corresponds to the location of the at least one selected stored field in the digital master document.

8. The method of claim 7, wherein automatically identifying the location of one or more fields within the scanned copy further comprises automatically identifying the location of the one or more fields within the scanned copy using the field characteristic information.

* * * * *